United States Patent
Onodera et al.

(10) Patent No.: US 12,319,837 B2
(45) Date of Patent: Jun. 3, 2025

(54) METHOD FOR PRODUCING CONDUCTIVE POLYMER-CONTAINING POROUS BODY

(71) Applicant: IDEMITSU KOSAN CO., LTD., Tokyo (JP)

(72) Inventors: Shingo Onodera, Chiba (JP); Toru Bando, Chiba (JP)

(73) Assignee: IDEMITSU KOSAN CO., LTD., Tokyo (JP)

( * ) Notice: Subject to any disclaimer, the term of this patent is extended or adjusted under 35 U.S.C. 154(b) by 679 days.

(21) Appl. No.: 17/291,642

(22) PCT Filed: Nov. 8, 2019

(86) PCT No.: PCT/JP2019/043798
§ 371 (c)(1),
(2) Date: May 6, 2021

(87) PCT Pub. No.: WO2020/096028
PCT Pub. Date: May 14, 2020

(65) Prior Publication Data
US 2021/0403729 A1 Dec. 30, 2021

(30) Foreign Application Priority Data
Nov. 9, 2018 (JP) .................................. 2018-211733

(51) Int. Cl.
*C09D 5/24* (2006.01)
*C08G 73/02* (2006.01)
*C08K 5/09* (2006.01)
*C08K 5/13* (2006.01)
*C09D 7/20* (2018.01)
*C09D 7/63* (2018.01)
*C09D 179/02* (2006.01)
*H01B 1/12* (2006.01)
*H01G 9/025* (2006.01)

(52) U.S. Cl.
CPC .......... *C09D 5/24* (2013.01); *C08G 73/0266* (2013.01); *C08K 5/09* (2013.01); *C08K 5/13* (2013.01); *C09D 7/20* (2018.01); *C09D 7/63* (2018.01); *C09D 179/02* (2013.01); *H01B 1/124* (2013.01); *H01G 9/025* (2013.01)

(58) Field of Classification Search
CPC .......... C09D 7/20; C09D 7/63; C09D 179/02; C08G 73/0266; C08K 5/09
See application file for complete search history.

(56) References Cited

U.S. PATENT DOCUMENTS

| 9,384,866 | B2 | 7/2016 | Jibiki et al. |
| 10,975,200 | B2 | 4/2021 | Onodera et al. |
| 2006/0062958 | A1* | 3/2006 | Yoshida ............. H01G 9/042 428/64.4 |
| 2007/0085061 | A1* | 4/2007 | Elder ................. H01G 9/028 252/500 |
| 2009/0021894 | A1* | 1/2009 | Ning ................. H01B 1/124 29/25.03 |
| 2009/0026085 | A1* | 1/2009 | Uchi ................. H01M 4/606 205/414 |
| 2010/0046141 | A1 | 2/2010 | Thomas |
| 2010/0188802 | A1* | 7/2010 | Yoshida ............. H01G 11/56 427/79 |
| 2013/0230778 | A1* | 9/2013 | Saimen ............. H01M 10/0525 429/303 |
| 2014/0008582 | A1 | 1/2014 | Jibiki et al. |
| 2014/0014881 | A1* | 1/2014 | Takeda ............. H01B 1/127 252/500 |
| 2015/0279502 | A1* | 10/2015 | Yamazaki .......... C08G 73/0266 252/500 |
| 2015/0279504 | A1* | 10/2015 | Viville ............. C08K 3/042 252/511 |
| 2017/0018326 | A1* | 1/2017 | Sotzing ............. B32B 5/024 |
| 2017/0263347 | A1 | 9/2017 | Yamazaki et al. |
| 2018/0334577 | A1* | 11/2018 | Matsubayashi ........ H01G 9/048 |
| 2019/0062501 | A1* | 2/2019 | Onodera ............. C08K 5/005 |

FOREIGN PATENT DOCUMENTS

| CN | 108701546 B | 3/2022 | |
| JP | 2009130256 A | 6/2009 | |
| JP | 2013-219208 | * 10/2013 | ............. H01G 9/028 |
| JP | 2014-28949 | * 2/2014 | ............. C08G 73/00 |
| JP | 2014-82392 | * 5/2014 | ............. H01G 9/028 |
| JP | 2014-86473 | * 5/2014 | ............. H01G 9/028 |
| JP | 2014-90107 | * 5/2014 | ............. H01G 9/028 |
| TW | I613232 B | 2/2018 | |
| WO | WO 2009/091184 A3 * | 1/2009 | ............. C08G 73/02 |
| WO | 12102017 A1 | 8/2012 | |
| WO | 17150407 A1 | 9/2017 | |
| WO | WO 2017/150407 A1 * | 9/2017 | ............. C08K 3/22 |

OTHER PUBLICATIONS

Bhadra, Sambhu, et al., "Progress in preparation, processing and applications of polyaniline". Progress in Polymer Science 34 (2009) 783-810.*
Hussin, Hazira, et al., "Synthesis of Water-soluble Polyaniline by Using Different Types of Cellulose Derivatives". Polymers & Polymer Composites, vol. 25, No. 7, 2017, pp. 515-520.*
Farrokhzad, Hasan, et al., "Preparation and characterization of a conductive polyaniline/polysulfone film and evaluation of the effect of co-solvent". European Polymer Journal 49 (2013) 3234-3243.*
Kaur, Gagan, et al., "Electrically conductive polymers and composites for biomedical applications". RSC Advances, 2015, 5, 37553-37567.*
Wang, Yue, et al., "A highly stretchable, transparent, and conductive polymer". Science Advances, 2017, 3: e1602076, pp. 1-10.*

(Continued)

*Primary Examiner* — Bret P Chen
(74) *Attorney, Agent, or Firm* — Csaba Henter; MILLEN, WHITE, ZELANO & BRANIGAN

(57) ABSTRACT

A method for production of a porous body containing a conductive polymer comprising impregnating a porous body with a conductive polymer composition comprising component (a) a conductive polymer and component (b) a solvent, and drying the porous body after impregnation at a temperature lower than the boiling point of the solvent by 10° C. or more, followed by drying at a temperature higher than or equal to the boiling point of the solvent.

20 Claims, 1 Drawing Sheet

(56) References Cited

OTHER PUBLICATIONS

Berttucci, Ottavia, et al., "Conductive Polymer-Based Bioelectronic Platforms toward Sustainable and Biointegrated Devices: A Journey from Skin to Brain across Human Body Interfaces". Advance Materials Tehcnologies, 2022, 7, 2100293, pp. 1-38.*

Garcia-Cabezon, C., et al., "Nanocomposites of Conductive Polymers and Nanoparticles Deposited on Porous Material as a Strategy to Improve its Corrosion Resistance". Surface and Coatings Technology, 2020, vol. 403, 126395, pp. 1-12.*

Abshirini, Mohammad, et al., "Three-Dimensional Printed Highly Porous and Flexible Conductive Polymer Nanocomposites with Dual-Scale Porosity and Piezoresistive Sensing Functions". ACS Applied Materials & Interfaces, 2023, 15, 14810-14825.*

Nezakati, Toktam, et al., "Conductive Polymers: Opportunities and Challenges in Biomedical Applications". Chemical Reviews 2018, 118, 6766-6843.*

Mao, Jifu, et al., "Conductive Polymer Waving in Liquid Nitrogen". ACS Nano 2017, 11, 10409-10416.*

Balint, Richard, et al., "Conductive polymers: Towards a smart biomaterial for tissue engineering". Acta Biomaterialia 10 (2014) 2341-2353.*

Search Report in corresponding EP19881624.1 dated Jul. 6, 2022 (pp. 1-2).

Office Action in corresponding China application 201980073739.6 dated Sep. 13, 2022 (pp. 1-6).

Search report in corresponding TW application 108140638 dated Oct. 19, 2022 (pp. 1-6).

International Search Report for PCT/JP2019/043798 dated Jan. 28, 2020 (pp. 1-2).

International Preliminary Patentability Report for PCT/JP2019/043798 (IB338) dated May 11, 2021 (pp. 1-8).

* cited by examiner

METHOD FOR PRODUCING CONDUCTIVE POLYMER-CONTAINING POROUS BODY

TECHNICAL FIELD

The invention relates to a method for production of a porous body containing a conductive polymer.

BACKGROUND ART

Conductive polymers are used as conductive inks for solid electrolytes of capacitors, electromagnetic wave absorbing coating agents, antistatic coating agents, electroplating undercoat materials, circuit wiring applications, and the like.

Polyaniline, a kind of conductive polymer, in addition to having electrical properties, can be relatively easily synthesized from inexpensive aniline. For example, a highly conductive polyaniline can be easily obtained by the method described in Patent Document 1. Further, polyaniline has an advantage of exhibiting excellent stability to oxygen or the like in a state of exhibiting conductivity.

On the other hand, porous bodies have been used in diverse fields such as electrode materials and adsorbents due to their large specific surface area.

A porous body containing a conductive polymer in which a conductive polymer is contained in a porous body is used, for example, in solid electrolytes of solid electrolytic capacitors. By using the conductive polymer, a high-performance capacitor having high heat-resistance and low electrical resistance can be manufactured.

Regarding a method for producing a porous body containing a conductive polymer, for example, Patent Document 2 discloses that an acid is added to a polyaniline solution or a porous body surface is subjected to an acid treatment, whereby penetration into the inside of the porous body can be increased. However, depending on the drying conditions, polyaniline is drawn outward from the inside of the porous body together with evaporation of the solvent during drying, and the amount of adhesion of polyaniline and the uniformity of adhesion inside the porous body may decrease.

RELATED ART DOCUMENTS

Patent Documents

[Patent Document 1] WO 2012/102017 A1
[Patent Document 2] WO 2017/150407 A1

SUMMARY OF THE INVENTION

It is an object of the invention is to provide a method of production of a porous body containing a conductive polymer capable of increasing the amount and improving uniformity of adhesion of a conductive polymer inside the porous body.

According to an aspect of the invention, a method of production of a porous body containing a conductive polymer comprising: impregnating a porous body with a conductive polymer composition comprising component (a) a conductive polymer and component (b) a solvent, and drying the porous body after impregnation at a temperature lower than the boiling point of the solvent by 10° C. or more, followed by drying at a temperature higher than or equal to the boiling point of the solvent can be provided.

According to the invention, a method of production of a porous body containing a conductive polymer capable of increasing the amount and improving uniformity of adhesion of a conductive polymer inside a porous body can be provided.

MODE FOR CARRYING OUT THE INVENTION

First Aspect

Figure 1:
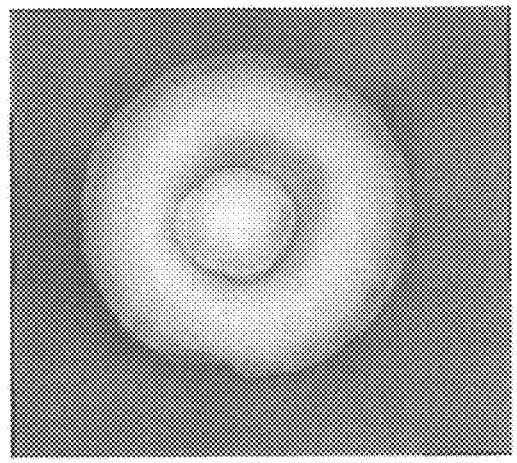
FIG. 1 is a micrograph of a cross section of the porous body containing a conductive polymer of Example 4.

A method of production of a porous body containing a conductive polymer according to an aspect of the invention includes the following steps (A) and (B).

Step (A): impregnating a porous body with a conductive polymer composition containing (a) a conductive polymer and (b) a solvent.

Step (B): drying the porous body after impregnation at a temperature lower than the boiling point of the solvent (the solvent having the lowest boiling point in the composition) by 10° C. or more, followed by drying at a temperature higher than or equal to the boiling point of the solvent.

In this aspect, by subjecting a porous body impregnated with a conductive polymer composition to two-stages of drying at different temperatures, the amount of adhesion of the conductive polymer inside the porous body can be increased. Further, a porous body containing a conductive polymer having improved uniformity of adhesion of the conductive polymer can be manufactured. In addition, when two or more kinds of solvents are used as an mixture, the "boiling point of the solvent" means the boiling point of the solvent having the lowest boiling point among them.

Hereinafter, components and the like used in this aspect will be described.

The conductive polymer composition used in step (A) contains (a) a conductive polymer and (b) a solvent.

(a) Conductive Polymer

Examples of the conductive polymers (component (a)) include polyaniline, polythiophene, polypyrrole, and derivatives thereof. They may or may not have a substituent. One of these may be used alone, or two or more may be used in combination.

As the conductive polymer, polyaniline is preferred.

Polyaniline preferably has a weight-average molecular weight of 10,000 or more, more preferably 20,000 or more, still more preferably 30,000 or more and 1,000,000 or less, further still more preferably 40,000 or more and 1,000,000 or less, and particularly preferably 52,000 or more and 1,000,000 or less.

For example, when the porous body containing a conductive polymer is used in the solid electrolyte layer of a solid electrolytic capacitor, it is preferable in general that the conductive polymer has a larger molecular weight from the viewpoint of being able to increase the strength of the resulting electrolyte layer. On the other hand, when a conductive polymer having a large molecular weight is used, the viscosity of the conductive polymer increases, and therefore, the impregnation into the pores of the porous body may be difficult.

The molecular weight of polyaniline is measured in polystyrene conversion by gel permeation chromatography (GPC).

Polyaniline is preferably an unsubstituted polyaniline from the viewpoint of versatility and economic efficiency.

When polyaniline has a substituent, examples of the substituent include linear or branched hydrocarbon groups such as a methyl group, an ethyl group, a hexyl group, and an octyl group; alkoxy groups such as a methoxy group and an ethoxy group; aryloxy groups such as a phenoxy group; halogenated hydrocarbon groups such as a trifluoromethyl group (—$CF_3$ group).

In one embodiment of the invention, the conductive polymer is preferably a polyaniline complex in which a proton donor is doped into polyaniline. By using the polyaniline complex, solubility thereof in a solvent is increased.

The doping of polyaniline with the proton-donor can be confirmed by ultraviolet, visible, near-infrared spectroscopy or X-ray photoelectron spectroscopy. The proton donor can be used without any particular limitation as long as it has sufficient acidity to allow polyaniline to generate a carrier.

Examples of the proton donor include, for example, Brønsted acids, and salts thereof. The proton donor is preferably organic acids, or salts thereof, and more preferably a proton donor represented by the following formula (I):

$$M(XAR_n)m \qquad (I)$$

M of the formula (I) is a hydrogen atom, an organic free radical, or an inorganic free radical.

Examples of the organic free radical include a pyridinium group, an imidazolium group, and an anilinium group. Further, examples of the inorganic free radical include lithium, sodium, potassium, cesium, ammonium, calcium, magnesium, and iron.

X in the formula (I) is an anionic group, for example, a —$SO_3^-$ group, a —$PO_3^{2-}$ group, a —$PO_4(OH)^-$ group, a —$OPO_3^{2-}$ group, a —$OPO_2(OH)^-$ group and a —$COO^-$ group, and preferably a —$SO_3^-$ group.

A in the formula (I) is a substituted or unsubstituted hydrocarbon group (including 1 to 20 carbon atoms, for example).

The hydrocarbon group is an open-chain or cyclic saturated aliphatic hydrocarbon group, an open-chain or cyclic unsaturated aliphatic hydrocarbon group, or an aromatic hydrocarbon group.

Examples of the open-chain saturated aliphatic hydrocarbon group include a linear or branched alkyl group (including 1 to 20 carbon atoms, for example). Examples of the cyclic saturated aliphatic hydrocarbon group include cycloalkyl groups (including 3 to 20 carbon atoms, for example) such as a cyclopentyl group, a cyclohexyl group, a cycloheptyl group, a cyclooctyl group, and the like. The cyclic saturated aliphatic hydrocarbon group may be fused with a plurality of cyclic saturated aliphatic hydrocarbon groups. Examples thereof include a norbornyl group, an adamantyl group, and a fused adamantyl group. Examples of the open-chain unsaturated aliphatic hydrocarbon group (including 2 to 20 carbon atoms, for example) include linear or branched alkenyl groups. Examples of the cyclic unsaturation aliphatic hydrocarbon group (including 3 to 20 carbon atoms, for example) include cyclic alkenyl groups. Examples of the aromatic hydrocarbon group (including 6 to 20 carbon atoms, for example) include a phenyl group, a naphthyl group, and an anthracenyl group.

When A is a substituted hydrocarbon group, the substituent is an alkyl group (including 1 to 20 carbon atoms, for example), a cycloalkyl group (including 3 to 20 carbon atoms, for example), a vinyl group, an allyl group, an aryl group (including 6 to 20 carbon atoms, for example), an alkoxy group (including 1 to 20 carbon atoms, for example), a halogen atom, a hydroxy group, an amino group, an imino group, a nitro group, a silyl group, or an ester bond-containing group.

R in the formula (I) is bound with A and is —H or a substituent represented by —$R^1$, —$OR^1$, —$COR^1$, —$COOR^1$, —(C=O)—($COR^1$), or —(C=O)—($COOR^1$). $R^1$ is a hydrocarbon group which may contain a substituent, a silyl group, an alkylsilyl group, a —$(R^2O)_x$—$R^3$ group, or a —$(OSiR^3{}_2)_x$—$OR^3$ group. $R^2$ is an alkylene group, $R^3$ is a hydrocarbon group, and x is an integer of 1 or more. When x is 2 or more, a plurality of $R^2$'s may be the same or different, and a plurality of $R^3$'s may be the same or different.

Examples of the hydrocarbon group (including 1 to 20 carbon atoms, for example) for $R^1$ include a methyl group, an ethyl group, a butyl group, a pentyl group, a hexyl group, a heptyl group, an octyl group, a nonyl group, a decyl group, a dodecyl group, a pentadecyl group, and an eicosanil group. The hydrocarbon group may be linear or branched.

The substituent of the hydrocarbon group is an alkyl group (including 1 to 20 carbon atoms, for example), a cycloalkyl group (including 3 to 20 carbon atoms, for example), a vinyl group, an allyl group, an aryl group (including 6 to 20 carbon atoms, for example), an alkoxy group (including 1 to 20 carbon atoms, for example), a halogen atom, a hydroxy group, an amino group, an imino group, a nitro group, or an ester bond-containing group. The hydrocarbon group for $R^3$ is the same as those for $R^1$.

Examples of the alkylene group (including 1 to 20 carbon atoms, for example) for $R^2$ include, for example, a methylene group, an ethylene group, and a propylene group.

In the formula (I), n is an integer of 1 or more. When n is 2 or more, a plurality of R's may be the same or different.

m in the formula (I) is "the valence of M/the valence of X."

As the compound represented by the formula (I), a dialkylbenzenesulfonic acid, a dialkylnaphthalenesulfonic acid, or a compound containing two or more ester bonds is preferred.

The compound containing two or more of ester bonds is more preferably a sulfophthalic ester or a compound represented by the following formula (II):

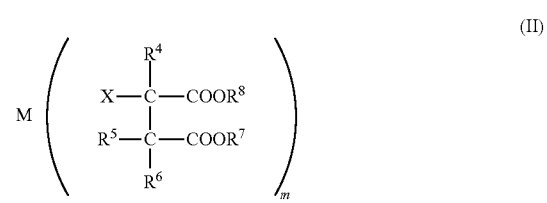

In the formula (II), M and X are the same as those in the formula (I). X is preferably a —$SO_3^-$ group.

$R^4$, $R^5$, and $R^6$ are independently a hydrogen atom, a hydrocarbon group, or a $R^9{}_3Si$— group. Three $R^9$'s are independently a hydrocarbon group.

When $R^4$, $R^5$, and $R^6$ are hydrocarbon groups, examples of the hydrocarbon group include a linear or branched alkyl group including 1 to 24 carbon atoms, an aryl group containing an aromatic ring (including 6 to 20 carbon atoms, for example), and an alkylaryl group (including 7 to 20 carbon atoms, for example).

The hydrocarbon group for $R^9$ is the same as those for $R^4$, $R^5$ and $R^6$.

$R^7$ and $R^8$ in the formula (II) are independently a hydrocarbon group or a —$(R^{10}O)_q$—$R^{11}$ group. $R^{10}$ is a hydrocarbon group or a silylene group, $R^{11}$ is a hydrogen atom, a hydrocarbon group, or $R^{12}_3Si$—, and q is an integer of 1 or more. Three $R^{12}$'s are independently a hydrocarbon group.

In the case where $R^7$ and $R^8$ are hydrocarbon groups, examples of the hydrocarbon group include a linear or branched alkyl group including 1 to 24, preferably 4 or more carbon atoms, an aryl group containing an aromatic ring (including 6 to 20 carbon atoms, for example), and an alkylaryl group (including 7 to 20 carbon atoms, for example). Specific examples thereof include, for example, a butyl group, a pentyl group, a hexyl group, an octyl group, and a decyl group, all of which are linear or branched.

Examples of the hydrocarbon group in the case where $R^{10}$ in $R^7$ and $R^8$ is a hydrocarbon group include, for example, a linear or branched alkylene group including 1 to 24 carbon atoms, an arylene group containing an aromatic ring (including 6 to 20 carbon atoms, for example), an alkylarylene group (including 7 to 20 carbon atoms, for example), and an arylalkylene group (including 7 to 20 carbon atoms, for example). In addition, examples of the hydrocarbon group in the case where $R^{11}$ and $R^{12}$ in $R^7$ and $R^8$ are hydrocarbon groups, are the same as those in $R^4$, $R^5$, and $R^6$. q is preferably an integer of 1 to 10.

Specific examples of the compound represented by the formula (II) in the case where $R^7$ and $R^8$ are —$(R^{10}O)_q$—$R^{11}$ groups, include two compounds represented by the following formulas:

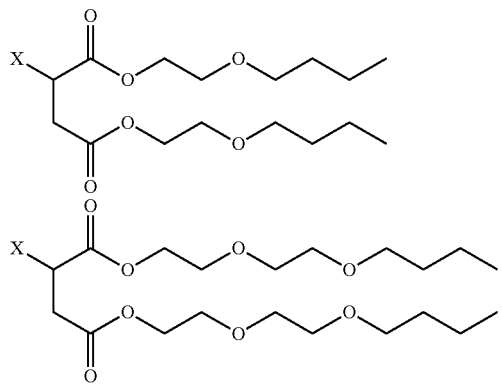

wherein in the formula, X is the same as that in the formula (I).

It is further preferable that the compound represented by the formula (II) is a sulfosuccinic acid derivative represented by the following formula (III):

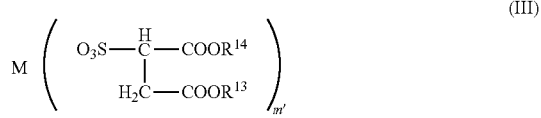

In the formula (III), M is the same as that in the formula (I). m' is the valence of M.

$R^{13}$ and $R^{14}$ are independently a hydrocarbon group or a —$(R^{15}O)_r R^{16}$ group. $R^{15}$ is a hydrocarbon group or a silylene group, $R^{16}$ is a hydrogen atom, a hydrocarbon group, or a $R^{17}_3Si$— group, and r is an integer of 1 or more.

Three $R^{17}$'s are independently a hydrocarbon group. When r is 2 or more, a plurality of $R^{15}$'s may be the same or different.

Examples of the hydrocarbon group in the case where $R^{13}$ and $R^{14}$ are hydrocarbon groups are the same as those in $R^7$ and $R^8$.

Examples of the hydrocarbon group in the case where $R^{15}$ in $R^{13}$ and $R^{14}$ is a hydrocarbon group are the same as those in $R^{10}$. In addition, examples of the hydrocarbon group in the case where $R^{16}$ and $R^{17}$ in $R^{13}$ and $R^{14}$ are hydrocarbon groups are the same as those in $R^4$, $R^5$, and $R^6$.

r is preferably 1 to 10.

Specific examples when $R^{13}$ and $R^{14}$ are a —$(R^{15}O)_r$—$R^{16}$ group are the same as those of —$(R^{10}O)_q$—$R^{11}$ in $R^7$ and $R^8$.

Examples of the hydrocarbon group of $R^{13}$ and $R^{14}$ are the same as those in $R^7$ and $R^8$, and is preferably a butyl group, a hexyl group, a 2-ethylhexyl group, and a decyl group.

As the compound represented by the formula (I), di(2-ethylhexyl)sulfosuccinic acid and sodium di(2-ethylhexyl) sulfosuccinate are preferred.

It is known that the proton donor can control the conductivity and solubility in a solvent of a polyaniline complex by changing its structure (JP 3384566 B1). In this aspect of the invention, the optimal proton donor can be selected depending on the characteristics required for each application.

The doping ratio of the proton donor to polyaniline is preferably 0.30 or more and 0.65 or less, more preferably 0.32 or more and 0.60 or less, still more preferably 0.33 or more and 0.57 or less, and particularly preferably 0.34 or more and 0.55 or less. Normally, when the doping ratio is 0.30 or more, solubility of the polyaniline complex in an organic solvent is sufficient.

The doping ratio is defined as (the number of moles of the proton donor doped into polyaniline)/(the number of moles of the monomer unit of polyaniline). For example, a doping ratio of 0.5 for a polyaniline complex containing unsubstituted polyaniline and a proton donor means that one proton donor is doped into every two monomer unit molecules of polyaniline.

Note that the doping ratio can be calculated as long as the number of moles of the proton donor and the monomer unit of polyaniline in the polyaniline complex can be measured. For example, when the proton donor is an organic sulfonic acid, the number of moles of sulfur atom derived from a proton donor and the number of moles of nitrogen atom derived from a monomer unit of polyaniline can be quantified by an organic elemental analysis, and the doping ratio can be calculated by determining the ratio of these values.

It is preferable that the polyaniline complex contains unsubstituted polyaniline and a sulfonic acid which is a proton donor, and satisfies the following expression (1).

$$0.32 \le S_5/N_5 \le 0.60 \quad (1)$$

wherein in the formula, $S_5$ is the total number of moles of sulfur atom contained in the polyaniline complex and $N_5$ is the total number of moles of nitrogen atom contained in the polyaniline complex.

Note that the respective numbers of moles of the nitrogen atom and the sulfur atom are, for example, values measured by an organic elemental analysis.

(b) Solvent

The solvent (component (b)) is not particularly limited as long as the solvent dissolves a conductive polymer. However, the components (c) to (e) described later are not included in the solvent. The solvent is preferably an organic solvent. Examples thereof include aromatic hydrocarbons, aliphatic hydrocarbons, alcohols, ketones, ethers, and esters. One of these may be used alone, or two or more may be used in combination.

The organic solvent may be a water-soluble organic solvent, and may be an organic solvent which is substantially immiscible with water (water-immiscible organic solvent).

As the water-soluble organic solvent, a highly polar organic solvent can be used, and may be a protic polar solvent or an aprotic polar solvent. Examples thereof include alcohols such as methanol, ethanol, isopropyl alcohol, 1-butanol, 2-butanol, 2-pentanol, benzyl alcohol, and alkoxy alcohols (e.g., 1-methoxy-2-propanol, and 3-methoxy-1-butanol); ketones such as acetone, methyl ethyl ketone, and methyl isobutyl ketone; ethers such as tetrahydrofuran, dioxane, diethyl ether, and ethylene glycol mono tert-butyl ether; and aprotic polar solvents such as N-methylpyrrolidone.

As the water-immiscible organic solvent, a low polar organic solvent can be used. Examples thereof include hydrocarbon solvents such as hexane, benzene, toluene, xylene, ethyl benzene, and tetralin; halogen containing solvents such as methylene chloride, chloroform, carbon tetrachloride, dichloroethane, and tetrachloroethane; ester solvents such as ethyl acetate, isobutyl acetate, and n-butyl acetate; ketones such as methyl isobutyl ketone (MIBK), methyl ethyl ketone, cyclopentanone, and cyclohexanone; and ether solvents such as cyclopentyl methyl ether. Further, isoparaffin solvents containing one or two or more kinds of isoparaffins may be used as the hydrocarbon solvent.

Of these, toluene, xylene, methyl isobutyl ketone, chloroform, trichloroethane, and ethyl acetate are preferred in view of excellent solubility of the conductive polymer.

Even if the solvent is an alcohol such as isopropyl alcohol, 1-butanol, 2-butanol, 2-pentanol, benzyl alcohol, or alkoxy alcohol, a polyaniline complex can be dissolved. Alcohols are preferable from the viewpoint of reducing environmental load compared with aromatic solvents such as toluene.

When an organic solvent is used as a solvent, it is preferable to use a mixed organic solvent in which a water-immiscible organic solvent and a water-soluble organic solvent are mixed in a ratio of 99 to 1:1 to 99 (mass ratio), from the viewpoints of preventing generation of gel or the like during storage and possibility of a long time storage. The mixed organic solvent may contain one or two or more kinds of water-immiscible organic solvents, and may contain one or two or more kinds of water-soluble organic solvents.

The concentration of the component (a) relative to the solvent [component (a)/(component (a)+component (b))× 100] may be 0.01% by mass or more, may be 0.03% by mass or more, and may be 0.05% by mass or more. Further, the concentration is normally 15.0% by mass or less, may be 10.0% by mass or less, may be 5.0% by mass or less, may be 1.0% by mass or less, may be 0.5% by mass or less, may be 0.3% by mass or less, and may be 0.1% by mass or less.

When the conductive polymer composition contains components (c) and (e) described later, the concentration of the component (a) relative to the solvent is calculated by the following formula, and the boiling point is determined only by the component (b).

Concentration of component ($a$) (% by mass)=component ($a$)/(component ($a$)+($b$)+($c$)+($e$))×100

In one embodiment of the invention, the conductive polymer complex may or may not further contain (c) an acid or salt (component (c)).

Further, the component (c) may be mixed with the component (b) and used as a mixed solvent. In this case, the concentration of the component (a) relative to the solvent is calculated relative to the total mass of the component (b) and the component (c).

The acid or salt is not particularly limited. However, the component (c) does not include the components (d) and (e) described later. The acid is an Arrhenius acid or a Brønsted acid having an acidic group ($H^+$). Examples thereof include sulfonic acid and its salts, phosphoric acid and its salts, phosphate esters and their salts, carboxylic acids and their salts, amino acids and their salts, boric acid and its salts, and boronic acid and its salts.

As the salt, an ammonium salt, an alkali metal salt (e.g., a sodium salt, a lithium salt, a potassium salt, and the like) of the corresponding acids and the like can be used.

Specific examples thereof include phosphoric acid and its salts; monomethyl phosphate and its salt, dimethyl phosphate and its salt, a mixture of monomethyl phosphate and dimethyl phosphate, and a mixture of a salt of monomethyl phosphate and a salt of dimethyl phosphate; monoethyl phosphate and its salt, diethyl phosphate and its salt, a mixture of monoethyl phosphate and diethyl phosphate, and a mixture of a salt of monoethyl phosphate and a salt of diethyl phosphate; monoisopropyl phosphate and its salt, diisopropyl phosphate and its salt, a mixture of monoisopropyl phosphate and diisopropyl phosphate, and a mixture of a salt of monoisopropyl phosphate and a salt of diisopropyl phosphate; monobutyl phosphate and its salt, dibutyl phosphate and its salt, a mixture of monobutyl phosphate and dibutyl phosphate, and ta mixture of a salt of monobutyl phosphate and a salt of dibutyl phosphate; mono(2-ethylhexyl) phosphate and its salt, di(2-ethylhexyl) phosphate and its salt, a mixture of mono(2-ethylhexyl) phosphoric acid and di(2-ethylhexyl) phosphoric acid, and a mixture of a salt of mono(2-ethylhexyl) phosphoric acid and a salt of di(2-ethylhexyl) phosphoric acid; acetic acid and its salt; propionic acid and its salt; butyric acid and its salt; DL-2-methylbutyric acid and its salt; 2-ethylhexanoic acid and its salt; 3,5,5-trimethylhexanoic acid and its salt; myristic acid and its salt; 2-methylvaleric acid and its salt; adipic acid and its salt; glycine and its salt; @-alanine and its salt; DL-alanine and its salt; DL-valine and its salt; (±)-10-camphorsulfonic acid and its salt; dioctyl sulfosuccinate and its salt; 2-[4-(2-hydroxyethyl)-1-biperazinyl]ethanesulfonic acid and its salt; boric acid and borate; dodecylbenzenesulfonic acid and dodecylbenzenesulfonate; and phenylboronic acid and phenylboronate.

One of these may be used alone, or two or more may be used in combination.

Of the above, phosphoric acid esters and salts thereof, carboxylic acids and salts thereof, carboxylic acid esters and salts thereof, amino acids and salts thereof, and the like may be used. It may be employed a constitution that an acid different from the heat-resistance stabilizer is used.

The solubility parameter (SP value) of the component (c) is preferably 13.0 $(cal/cm^3)^{1/2}$ or less, and more preferably 11.0 $(cal/cm^3)^{1/2}$ or less. Further, the SP value may be 10.0 $(cal/cm^3)^{1/2}$ or less. The SP value is usually 0 $(cal/cm^3)^{1/2}$ or more.

The SP value is calculated by Fedors method described in "Polymer Engineering & Science," 1974, Volume 14, pp. 147-154.

The component (c) is preferably an acid having a hydrophobic group.

Examples of the hydrophobic group include a linear alkyl group, a branched alkyl group, an alkylphenyl group, and an alkylnaphthyl group. The number of carbons of the alkyl group contained in the linear alkyl group, the branched alkyl group, the alkylphenyl group, and the alkylnaphthyl group is preferably 2 to 20.

Examples of the component (c) include an alkyl carboxylic acid, a phosphoric monoester, a phosphoric diester, an alkylbenzenecarboxylic acid, and an alkylbenzenephosphonic acid. Note that the alkylbenzenecarboxylic acid is a compound represented by R-Ph-COOH, and the alkylbenzenephosphonic acid is a compound represented by R-Ph-PO(OH)$_2$ (in the formula, R represents an alkyl group, and Ph represents a phenyl group).

The number of carbons of the alkyl group in the alkylcarboxylic acid, the alkylbenzenecarboxylic acid, and the alkylbenzenephosphonic acid is preferably 2 to 20. The phosphoric monoester and the phosphoric diester are preferably an ester obtained from phosphoric acid and an alcohol including 2 to 20 carbon atoms.

Specific examples of the component (c) include propionic acid, DL-2-methyl butyric acid, 2-methyl valeric acid, 2-ethylhexanoic acid, 3,5,5-trimethylhexanoic acid, myristic acid, monomethyl phosphate, dimethyl phosphate, a mixture of monomethyl phosphate and dimethyl phosphate, monoethyl phosphate, diethyl phosphate, a mixture of monoethyl phosphate and diethyl phosphate, monoisopropyl phosphate, diisopropyl phosphate, a mixture of monoisopropyl phosphate and diisopropyl phosphate, monobutyl phosphate, dibutyl phosphate, a mixture of monobutyl phosphate and dibutyl phosphate, mono(2-ethylhexyl) phosphate, di(2-ethylhexyl) phosphate, and a mixture of mono(2-ethylhexyl) phosphate and di(2-ethylhexyl) phosphate.

The content of the component (c) is preferably 0.1 to 70% by mass, more preferably 0.5 to 70% by mass, still more preferably 1 to 30% by mass, and further still more preferably 2 to 20% by mass, in the conductive polymer composition.

In one embodiment, the conductive polymer composition may further contain (d) a heat-resistant stabilizer, and/or (e) a phenolic compound.

(d) Heat-Resistant Stabilizer

Examples of the heat-resistance stabilizer (component (d)) include an acidic substance or a salt of an acidic substance. However, the component (d) does not include components (c) and (e).

The acidic substance may be either an organic acid which is an acid of an organic compound or an inorganic acid which is an acid of an inorganic compound, and is preferably an organic acid.

The acidic substance is preferably an organic acid containing one or more sulfonic acid groups.

The organic acid having the sulfonic acid group is preferably a cyclic, open-chain, or branched alkyl sulfonic acid, a substituted or unsubstituted aromatic sulfonic acid, or a polysulfonic acid, which has one or more sulfonic acid groups.

Examples of the alkyl sulfonic acid include, for example, methanesulfonic acid, ethanesulfonic acid, and di(2-ethylhexyl)sulfosuccinic acid. Here, the alkyl group is preferably a linear or branched alkyl group including 1 to 18 carbon atoms.

Examples of the aromatic sulfonic acid include those including 6 to 20 carbon atoms such as a sulfonic acid having a benzene ring, a sulfonic acid having a naphthalene skeleton, and a sulfonic acid having a anthracene skeleton. Further, examples of the aromatic sulfonic acid include a substituted or unsubstituted benzenesulfonic acid, a substituted or unsubstituted naphthalenesulfonic acid, and a substituted or unsubstituted anthracenesulfonic acid.

The substituent is, for example, a substituent selected from the group consisting of an alkyl group (e.g., including 1 to 20 carbon atoms), an alkoxy group (e.g., including 1 to 20 carbon atoms), a hydroxy group, a nitro group, a carboxy group, and an acyl group, and one or more substituents may be substituted.

Specific examples of the aromatic sulfonic acid include a compound represented by the following formula (4) or (5).

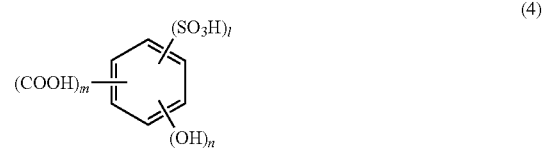

(4)

In the formula (4), l is an integer of 1 or more, m is an integer of 0 or more and 5 or less, n is an integer of 0 or more and 5 or less, and when one of m or n is 0, the other is 1 or more.

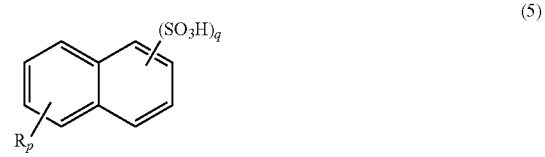

(5)

In the formula (5), q is an integer of 1 or more, p is an integer of 0 or more and 7 or less, and R's are independently an alkyl group including 1 to 20 carbon atoms, a carboxyl group, a hydroxyl group, a nitro group, a cyano group, and an amino group.

l is preferably 1 to 3. m is preferably 1 to 3. n is preferably 0 to 3.

q is preferably 1 to 3. p is preferably 0 to 3. R is preferably an alkyl group including 1 to 20 carbon atoms, a carboxylic group, or a hydroxyl group.

Examples of the aromatic sulfonic acid include 4-sulfophthalic acid, 5-sulfoisophthalic acid, 5-sulfosalicylic acid, 1-naphthalenesulfonic acid, 2-naphthalenesulfonic acid, 2-hydroxy-6-naphthalenesulfonic acid, p-phenolsulfonic acid, toluenesulfonic acid, p-xylene-2-sulfonic acid, 4,4'-biphenyldisulfonic acid, dibenzofuran-2-sulfonic acid, flavianic acid, (+)-10-camphorsulfonic acid, monoisopropylnaphthalenesulfonic acid, and 1-pyrenesulfonic acid. Of these, from the viewpoint of increasing heat resistance, 4-sulfophthalic acid, 5-sulfosalicylic acid, 5-sulfoisophthalic acid, 2-naphthalenesulfonic acid, dibenzofuran-2-sulfonic acid, flavianic acid, 2-hydroxy-6-naphthalenesulfonic acid, and 1-pyrenesulfonic acid are preferable.

Examples of the salt of the acidic substance include salts of compounds mentioned above. Examples of the counter ion of the salt include sodium, lithium, potassium, cesium, ammonium, calcium, and barium.

The component (d) may be a hydrate.

The content of the component (d) is preferably 0.1 to 1000 parts by mass, more preferably 1 to 100 parts by mass, and still more preferably 1 to 30 parts by mass, based on 100 parts by mass of the component (a).

Without blending the component (d) into the conductive polymer composition, the porous body after being impregnated with the conductive polymer composition may be separately immersed in a solution containing the component (d). As the component (d) in this case, the sulfonate represented by the formula (4) or a salt thereof is preferable.

The solution to be immersed may contain a solvent.

The solvent is not particularly limited as long as it can dissolve the component (d). Examples thereof include water, alcohol solvents, ketone solvents, ether solvents, ester solvents, and the like. The solvent may be used in one kind, or may be used in a mixture of two or more kinds.

Specific examples of the solvent include methanol, ethanol, isopropanol, n-butanol, 1-methoxy-2-propanol, 3-methoxy-1-butanol, 3-methoxy-3-methylbutanol, 1-ethoxy-2-propanol, ethyl acetate, butyl acetate, MIBK, methyl ethyl ketone (MEK), ethylene glycol mono tert-butyl ether, propylene glycol monomethyl ether acetate, and dipropylene glycol monomethyl ether.

Further, the content of the component (d) is preferably 0.1% by mass to 10% by mass, more preferably 0.3% by mass to 6% by mass, and still more preferably 0.7% by mass to 3.5% by mass, in the solution for immersion.

Examples of the method of immersion include dipping.

The immersion time is preferably 1 minutes or more, more preferably 3 minutes or more and 200 minutes or less. The immersion temperature is preferably 5° C. to 50° C.

Drying after immersion is preferably performed by an oven, a hot plate, or the like.

The drying temperature is preferably 80 to 200° C., more preferably 100 to 170° C.

The drying time is preferably 1 to 180 minutes, more preferably 3 to 60 minutes. If necessary, drying may be performed under reduced pressure. The drying temperature and the drying time are not particularly limited and may be appropriately selected depending on the material used.

As described above, the component (d) may be added in the conductive polymer composition, or separately, the porous body after impregnation with the conductive polymer composition may be immersed into the solution of the component (d). Also, the porous body may be impregnated by the composition to which the component (d) is added, and further immersed in the solution of the component (d).

In other words, in an aspect of the invention, the porous body may contain the component (d) which is added to the conductive polymer composition (hereinafter, sometimes referred to as component (d1)) and the component (d) to be impregnated after impregnation with the composition (hereinafter, sometimes referred to as component (d2)). The components (d1) and (d2) may be the same or different. When the components (d1) and (d2) are different, for example, the component (d1) is the compound represented by the formula (5), and the component (d2) is the compound represented by formula (4).

(e) Phenolic Compound

The phenolic compound (component (e)) is not particularly limited and is an ArOH, wherein Ar is an aryl group or a substituted aryl group. Note that the component (e) is a component different from the components (b) to (d).

Specific examples include phenol; substituted phenols such as o-, m-, or p-cresol, o-, m-, or p-ethyl phenol, o-, m-, or p-propylphenol, o-, m-, or p-butylphenol, o-, m- or p-chlorophenol, salicylic acid, hydroxybenzoic acid, and hydroxynaphthalene; polyvalent phenolic compounds such as catechol and resorcinol; and polymeric compounds such as phenolic resins, polyphenols, polyphenols, and poly(hydroxystyrene).

In addition, a phenolic compound represented by the following formula (6) may be used.

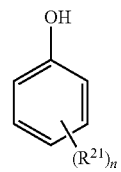

(6)

In the formula, n is an integer of 1 to 5. When n is 2 or more, a plurality of $R^{21}$'s may be the same as or different from each other.

$R^{21}$'s are independently an alkyl group including 2 to 10 carbon atoms, an alkenyl group including 2 to 20 carbon atoms, an alkylthio group including 1 to 20 carbon atoms, a cycloalkyl group including 3 to 10 carbon atoms, an aryl group including 6 to 20 carbon atoms, an alkylaryl group including 7 to 20 carbon atoms, or an arylalkyl group including 7 to 20 carbon atoms.

Examples of the alkyl group for $R^{21}$ include methyl, ethyl, propyl, isopropyl, butyl, isobutyl, tertiary butyl, and tertiary amyl.

Examples of the alkenyl group includes groups having an unsaturated bond in the molecular of the alkyl groups described above.

Examples of the cycloalkyl group include cyclopentane and cyclohexane.

Examples of the alkylthio group include methylthio and ethylthio.

Examples of the aryl group include phenyl and naphthyl.

Examples of the alkylaryl group and the arylalkyl group include groups obtained by combining the alkyl group and aryl group described above.

Among these groups, a methyl or ethyl group is preferable as $R^{21}$.

The content of the component (e) is 1 to 80% by mass, more preferably 5 to 60% by mass, and still more preferably 10 to 40% by mass in the conductive polymer composition. The use of the phenolic compound is preferable, since the conductivity and the solubility in alcohol are increased.

Further, the component (e) may be mixed with the component (b) and used as a mixed solvent. In this case, the concentration of the component (a) relative to the solvent is calculated relative to the total mass of the component (b) and the component (e).

The conductive polymer composition may consist essentially of the components (a) and (b), and optionally one or more selected from the group consisting of components (c), (d), and (e). In this case, an unavoidable impurity may be contained. For example, 70% by mass or more, 80% by mass or more, 90% by mass or more, 98% by mass or more, 99% by mass or more, and 99.5% by mass or more of the conductive polymer composition may be the components (a) and (b), and optionally one or more components selected from the group consisting of the components (c), (d), and (e). In addition, the conductive polymer composition may consist of the components (a) and (b), and optionally one or more selected from the group consisting of components (c), (d), and (e).

In this aspect, the above-described conductive polymer composition is impregnated into a porous body (the step (A)).

Examples of the porous body include oxide porous bodies of metals (e.g., aluminum, tantalum, niobium, titanium, hafnium, zirconium, zinc, tungsten, bismuth, and antimony), zeolites, activated carbon, and mesoporous silica.

The porous body is a material in which pores are present, and preferably has a large number of pores having a diameter of about 1 nm to 10 μm on the surface.

The shape of the porous body is not particularly limited, and is, for example, a molded body or a film (foil) having a certain thickness.

Examples of the porous body include a molded body consists of an oxide of a metal (e.g., a sphere consists of aluminum oxide having pores (alumina ball)). Further, examples of the porous body include a film (foil) consists of an oxide of a metal (e.g., a film (foil) consists of aluminum having etched holes by roughening, and aluminum oxide formed on the surface) (an anode material of an aluminum electrolytic capacitor), and a film consisting of a sintered body composed of tantalum particles and tantalum pentoxide formed on the surface of the sintered body (an anode material for a tantalum capacitor).

The method of impregnating the conductive polymer composition is not particularly limited as long as the method is capable of sufficiently impregnating the conductive polymer into the pores of the porous body. For example, a method of immersing a porous body in a conductive polymer solution is preferred. The impregnation (immersion) time is usually 1 to 30 minutes, preferably 1 to 10 minutes.

The porous body after impregnation with the conductive polymer composition may be impregnated with the solution of the component (d) as described above.

In this embodiment, the porous body after impregnation is dried twice or more times at different temperatures (the step (B)).

In the first drying step, the drying temperature ($T_f$) is set to a temperature lower than the boiling point ($T_b$) of the solvent by 10° C. or more ($T_b$-10° C. or lower). When two or more kinds of solvents are used in a mixture, the boiling point of the solvent is determined on the basis of the boiling point of a solvent having the lowest boiling point.

The drying temperature ($T_f$) is preferably 20° C. or higher, more preferably 30° C. or higher, and still more preferably 40° C. or higher.

The drying time is preferably 10 to 120 minutes, and more preferably 30 to 60 minutes.

The drying temperature does not have to be constant, and may be changed as long as the temperature is lower than the boiling point of the solvent by 10° C. or more.

Next, in the second drying step, the drying temperature is set to a temperature equal to or higher than the boiling point of the solvent. The drying temperature ($T_s$) is preferably in the following range (b1), and more preferably in the following range (b2).

$$T_b+0° C. \leq T_s \leq T_b+200° C. \quad (b1)$$

$$T_b+5° C. \leq T_s \leq T_b+100° C. \quad (b2)$$

The drying time is preferably 10 to 120 minutes, more preferably 30 to 60 minutes.

The drying temperature does not have to be constant, and can be changed as long as the temperature is equal to or higher than the boiling point of the solvent.

The step of impregnation with the conductive polymer composition (the step (A)) and the drying step (the step (B)) may be performed repeatedly, and, for example, may be performed repeatedly 2 to 10 times.

In addition, when the porous body is impregnated with the solution of the component (d), the drying step may be performed after impregnation of the porous body with the conductive polymer composition and before impregnation of the porous body with the solution of the component (d), or may be performed after impregnation of the porous body with the solution of the component (d). Further, the drying step may be performed both after impregnation of the porous body with the conductive polymer composition and after impregnation of the porous body with the solution of the component (d).

[Second Aspect]

A method for production of a porous body containing a conductive polymer according to an aspect of the invention includes the following steps (C), (A'), and (B):

Step (C): contacting a porous body with a solution of an acid or salt.

Step (A): impregnating a porous body with a conductive polymer composition containing (a) a conductive polymer and (b) a solvent simultaneously with the contacting or after the contacting.

Step (B): drying the porous body after impregnation at a temperature lower than the boiling point of the solvent by 10° C. or more, followed by drying the porous body at a temperature higher than or equal to the boiling point of the solvent.

In this aspect, a step of contacting the solution of an acid or salt with a porous body is provided. By contacting a solution of an acid or salt with the porous body, the surface of the porous body can be modified, and the conductive polymer composition can be permeated deep into the pores of the porous body.

Simultaneously with or after the contacting according to step (C), steps (A) and (B) are carried out. The steps (A) and (B) are the same as those in the first aspect.

In the step (C), the acid or salt used is the same as the component (c) of the first aspect. The concentration of the acid or salt in the solution is usually 0.5 to 15.0% by mass, and preferably 1.0 to 5.0% by mass. Depending on the kind of the acid or salt to be used, the concentration thereof is appropriately set within the range that the porous body is not dissolved.

The solvent of the solution is no particular limitation as long as the acid or salt is dissolved. Examples thereof include water, alcohols, ketones, ethers, and esters. In addition, the same solvent common to the solvent in the conductive polymer composition may be used. One of these may be used alone, or two or more may be used in combination.

The method of contacting is not particularly limited as long as the porous body and the solution of the acid or salt is sufficiently in contact with each other, and is preferably a method of immersing the porous body in the solution of the acid or salt.

The contacting (immersing) time with the solution is usually 1 to 30 minutes, and preferably 1 to 10 minutes. The contacting temperature is not particularly limited, and is normally room temperature. The contacting is preferably carried out under atmospheric or reduced pressure.

After contacting with a solution of an acid or salt, the porous body is normally dried. The drying condition varies depending upon the kind of the solution of the acid or salt or the solvent used, the condition is not particularly limited as long as the solvent in the solution can be removed. The drying temperature is normally 80 to 250° C., preferably 110 to 200° C., and more preferably 150 to 200° C. The drying time is usually 10 to 60 minutes, and preferably 30 to 60 minutes.

By drying at a higher temperature, a residual amount of the solvent or the like is made to be small, and permeation of the conductive polymer composition can be increased.

The porous body containing a conductive polymer obtained by the method of production according to the invention can be used for a solid electrolyte or the like of a solid electrolytic capacitor. The solid electrolytic capacitor can be used as a circuit device mounted on an electric or electron circuit substrate, in particular, as a circuit device mounted on a vehicle or the like.

EXAMPLES

Production Example 1 (Synthesis of the Polyaniline Complex)

To a 1000 mL separable flask, 32.4 g of NEOCOL SWC (sodium di(2-ethylhexyl)sulfosuccinate: manufactured by DKS Co., Ltd.), 13.3 g of aniline, and 0.9 g of Sorbon T-20 (a nonionic emulsifier having a polyoxyethylene sorbitan fatty acid ester structure: manufactured by Toho Chemical Industry Co., Ltd.) were charged with and 320.4 g of toluene was further added thereto to dissolve them. 450 g of a 17% by mass aqueous solution of phosphoric acid was added to the dissolved mixture, and the reaction solution having two liquid phases of toluene and water was stirred, and the internal temperature of the reaction solution was cooled to $-5°$ C. While stirring the reaction solution at a time when the internal temperature thereof reached $-5°$ C., a solution obtained by dissolving 39.3 g of ammonium persulfate in 90.2 g of a 17% by mass aqueous solution of phosphoric acid was added dropwise using a dropping funnel over 1 hour. After completion of the dropwise addition, the solution was stirred for 8 hours (total reaction time is 9 hours) while keeping the internal temperature of the solution at $-5°$ C. After the stirring was stopped, the contents were transferred to a separatory funnel, and the aqueous phase and the toluene phase were statically separated. After separation, the toluene phase was washed once with 180.3 g of a 8.5% by mass aqueous solution of phosphoric acid and 5 times with 328.0 g of ion-exchanged water to obtain a toluene solution of a polyaniline complex. This solution was filtered through a filter paper of No. 2 to remove insoluble matters, and a toluene solution of a polyaniline complex soluble in toluene was collected. This solution was transferred to an evaporator, warmed in a water bath at 60° C., and reduced in pressure, whereby the volatiles were distilled off to obtain a polyaniline complex (protonated polyaniline).

Example 1

(1) Production of Conductive Polymer Composition
15 g of DL-2-methyl butyric acid (component (c)), 32 g of isopropyl alcohol (component (b): boiling point of 82.4° C.), 32 g of p-tert-amylphenol (component (e)), and 21 g of hexane (component (b): boiling point of 69° C.) were mixed and stirred until being uniform to prepare a mixed solvent A. The concentration of the conductive polymer (polyaniline complex) is calculated assuming that all of these are solvents. On the other hand, the boiling point is determined based on the component (b) only.
To 99.5 g of the mixed solvent A, 0.5 g of a polyaniline complex (component (a)) was added and uniformly dissolved to prepare a polyaniline complex solution in which the concentration of the polyaniline complex was 0.5% by mass. Thereafter, 0.038 g of 2-naphthalenesulfonic acid hydrate (component (d)) was added to this polyaniline complex solution and uniformly dissolved to obtain a conductive polymer composition.

(2) Production and Evaluation of Porous Body Containing Conductive Polymer
One alumina ball ("NKHO-24" manufactured by Sumitomo Chemical Company, Limited: 3 mm in diameter, a porous body composed of aluminum oxide) were immersed in 3 g of the conductive polymer composition obtained by the above (1) for 5 minutes.
The alumina ball after immersion was dried at 40° C. for 30 minutes in a hot air dryer. Then, the temperature was increased from 40° C. to 150° C. over 30 minutes, and the alumina ball was dried at 150° C. for 30 minutes to produce an alumina ball containing a conductive polymer (a porous body containing a conductive polymer).
The obtained alumina ball containing a conductive polymer was cut with a nipper to observe a cross section. As a result, it was confirmed that the inside of the alumina ball was colored by the polyaniline complex, and that the polyaniline complex uniformly adhered to the inside of the alumina ball.

Example 2

A porous body containing a conductive polymer was produced and evaluated in the same manner as in Example 1 except that the two steps of immersion and drying of the alumina ball in Example 1 were repeated 3 times in total. As a result, it was confirmed that the polyaniline complex was uniformly adhered to the inside of the alumina ball.

Example 3

(1) Production of Conductive Polymer Composition
To 99.7 g of the same mixed solvent A as that in Example 1 (1), 0.3 g of a polyaniline complex (component (a)) was added and uniformly dissolved to prepare a polyaniline complex solution in which the concentration of the polyaniline complex was 0.3% by mass. Thereafter, 0.023 g of 2-naphthalenesulfonic acid hydrate was added to this polyaniline complex solution and uniformly dissolved to obtain a conductive polymer composition.
(2) Production and Evaluation of Porous Body Containing Conductive Polymer
A porous body containing a conductive polymer was produced by repeating the steps of immersion and drying 3 times in total and evaluated in the same manner as in Example 2 except that the conductive polymer composition (0.3% by mass) obtained in the above (1) was used. As a result, it was confirmed that the polyaniline complex was uniformly adhered to the inside of the alumina ball.

Example 4

(1) Production of Conductive Polymer Composition
To 99.9 g of the same mixed solvent A as that in Example 1 (1), 0.1 g of a polyaniline complex (component (a)) was added and uniformly dissolved to prepare a polyaniline complex solution in which the concentration of the polyaniline complex was 0.1% by mass. Thereafter, 0.0076 g of 2-naphthalenesulfonic acid hydrate was added to this polyaniline complex solution and uniformly dissolved to obtain a conductive polymer composition.
(2) Production and Evaluation of Porous Body Containing Conductive Polymer
A porous body containing a conductive polymer was produced by repeating the steps of immersion and drying 3 times in total and evaluated in the same manner as in Example 2 except that the conductive polymer composition (0.1% by mass) obtained in the above (1) was used. As a result, it was confirmed that the polyaniline complex was adhered to the inside of the alumina ball and that the polyaniline complex was uniformly adhered.

FIG. 1 shows a micrograph of a cross section of the porous body containing the conductive polymer of Example 4.

Comparative Example 1

One alumina ball was immersed in 3 g of the same conductive polymer composition (0.1% by mass) as that in Example 4 (1) for 5 minutes.

The alumina balls after immersion were dried at 150° C. for 20 minutes.

By repeating the above immersion and drying 3 times in total, an alumina ball containing a conductive polymer was produced.

As a result of evaluating the obtained alumina ball in the same manner as in Example 1, it was confirmed that the inside of the alumina ball was lightly colored by the polyaniline complex, and on the other hand, the outer portion of the alumina ball was darkly colored, which indicates that the amount of the polyaniline complex adhesion inside the alumina ball was small, and also, the polyaniline complex was unevenly adhered.

Figure 2:
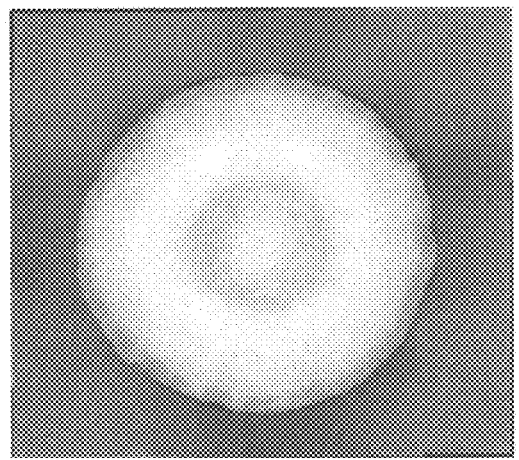
FIG. 2 is a micrograph of a cross section of the porous body containing a conductive polymer of Comparative Example 1.

FIG. 2 shows a micrograph of across section of the porous body containing a conductive polymer of Comparative Example 1.

Although only some exemplary embodiments and/or examples of this invention have been described in detail above, those skilled in the art will readily appreciate that many modifications are possible in the exemplary embodiments and/or examples without materially departing from the novel teachings and advantages of this invention. Accordingly, all such modifications are intended to be included within the scope of this invention.

The documents described in the specification and the specification of Japanese application(s) on the basis of which the present application claims Paris convention priority are incorporated herein by reference in its entirety.

The invention claimed is:

1. A method of production of a porous body containing a conductive polymer, comprising:
    impregnating a porous body with a conductive polymer composition comprising component (a) a conductive polymer and component (b) a solvent wherein the concentration of the component (a) is 0.5% by mass or less,
    a first drying step of drying the porous body after impregnation at a temperature lower than the boiling point of the solvent by 10° C. or more, and a second drying step of drying at a temperature higher than or equal to the boiling point of the solvent after the first drying step, wherein
    the porous body is an oxide porous body of metal, zeolite, activated carbon or mesoporous silica.

2. The method of production according to claim 1, wherein the conductive polymer composition further comprises component (c) an acid or salt.

3. The method of production according to claim 2, wherein the component (c) is an acid having a hydrophobic group, and
    the hydrophobic group is one or more selected from the group consisting of a linear alkyl group, a branched alkyl group, an alkylphenyl group, and an alkylnaphthyl group.

4. The method of production according to claim 2, wherein the component (c) is one or more selected from the group consisting of an alkyl carboxylic acid, a phosphoric monoester, a phosphoric diester, an alkyl benzenecarboxylic acid, and an alkyl benzenephosphonic acid.

5. The method of production according to claim 2, wherein the component (c) is one or more selected from the group consisting of propionic acid, DL-2-methyl butyric acid, 2-methyl valeric acid, 2-ethylhexanoic acid, 3,5,5-trimethylhexanoic acid, myristic acid, monomethyl phosphate, dimethyl phosphate, a mixture of monomethyl phosphate and dimethyl phosphate, monoethyl phosphate, diethyl phosphate, a mixture of monoethyl phosphate and diethyl phosphate, monoisopropyl phosphate, diisopropyl phosphate, a mixture of monoisopropyl phosphate and diisopropyl phosphate, monobutyl phosphate, dibutyl phosphate, a mixture of monobutyl phosphate and dibutyl phosphate, mono(2-ethylhexyl) phosphate, di(2-ethylhexyl) phosphate, and a mixture of mono(2-ethylhexyl) phosphate and di(2-ethylhexyl) phosphate.

6. The method of production according to claim 2, wherein the content of the component (c) is 1.0 to 70% by mass in the conductive polymer composition.

7. The method of production according to claim 1, wherein the component (a) is one or more selected from polyaniline, polyaniline derivatives, polythiophene, polythiophene derivatives, polypyrrole, and polypyrrole derivatives.

8. The method of production according to claim 1, wherein the component (a) is a polyaniline complex comprising a polyaniline and a proton donor, wherein the polyaniline is doped with the proton donor.

9. The method of production according to claim 1, wherein the conductive polymer composition further comprises component (d) a heat-resistant stabilizer.

10. The method of production according to claim 1, wherein the conductive polymer composition further comprises component (e) a phenolic compound.

11. The method of production according to claim 1, wherein the drying temperature ($T_s$) of the second drying step is in the following range (b1)

$$T_b+0°\ C.\leq T_s\leq T_b+200°\ C. \tag{b1}$$

wherein $T_b$ is the boiling point of the solvent.

12. The method of production according to claim 1, wherein the first drying step of drying the porous body after impregnation at a temperature lower than the boiling point of the solvent is by 20° C. or more.

13. A method for production of a porous body containing a conductive polymer, comprising:
    contacting a porous body with a solution of an acid or salt,
    impregnating the porous body with a conductive polymer composition comprising component (a) a conductive polymer and component (b) a solvent simultaneously with the contacting or after the contacting wherein the concentration of the component (a) is 0.5% by mass or less,
    a first drying step of drying the porous body after impregnation at a temperature lower than the boiling point of the solvent by 10° C. or more, and a second drying step of drying at a temperature higher than or equal to the boiling point of the solvent after the first drying step, wherein
    the porous body is an oxide porous body of metal, zeolite, activated carbon or mesoporous silica.

14. The method of production according to claim 13, wherein the concentration of the solution of the acid or salt is 1.0 to 15.0% by mass.

15. The method of production according to claim 13, wherein the acid or salt is one or more selected from the group consisting of sulfonic acid and its salts, phosphoric acid and its salts, phosphate esters and their salts, carboxylic acids and their salts, amino acids and their salts, boric acid and its salts, and boronic acid and its salts.

16. The method of production according to claim 13, wherein the component (a) is one or more selected from polyaniline, polyaniline derivatives, polythiophene, polythiophene derivatives, polypyrrole, and polypyrrole derivatives.

17. The method of production according to claim 13, wherein the component (a) is a polyaniline complex comprising a polyaniline and a proton donor, wherein the polyaniline is doped with the proton donor.

18. The method of production according to claim 17, wherein the conductive polymer composition comprises the polyaniline complex and a phenolic compound.

19. The method of production according to claim 17, wherein the conductive polymer composition comprises the polyaniline complex and a heat-resistant stabilizer.

20. The method of production according to claim 13, wherein the drying temperature ($T_s$) of the second drying step is in the following range (b1)

$$T_b+0° C. \leq T_s \leq T_b+200° C. \quad (b1)$$

wherein $T_b$ is the boiling point of the solvent.

* * * * *